United States Patent Office 3,006,933
Patented Oct. 31, 1961

3,006,933
11α-HYDROCARBYLSULFONYLOXY-3,5-PREGNADIENES
George R. Allen, Jr., Paramus, N.J., William S. Allen, Pearl River, N.Y., and Martin J. Weiss, Oradell, N.J., assignors to American Cyanamid Company, New York, N.Y., a corporation of Maine
No Drawing. Filed July 9, 1958, Ser. No. 747,328
6 Claims. (Cl. 260—397.45)

This invention relates to new steroid compounds. More particularly, it relates to substituted pregnadienes and methods of preparing the same.

The use of prednisolone and prednisone as glucocorticoids in the treatment of collagen diseases such as arthritis, bursitis, etc. is well known. Recently 9α-fluoro-16α-hydroxy prednisolone has come into prominent use because of its high activity and remarkable lack of side effects generally associated with previously used glucocorticoids. We have now found that 9α-fluoro-16α-hydroxy prednisolone can be prepared from a variety of structurally simpler intermediates.

The compounds of the present invention can be illustrated by the following general formula:

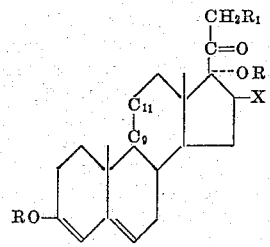

in which R is a lower alkanoyl radical, $R_1$ is hydrogen or a lower alkanoyloxy radical, X is a halogen atom and $C_9$–$C_{11}$ is the trivalent radical $-C=CH-;\ -CH-CH--OSO_2-$lower alkyl or —
$\quad\quad\quad\quad\quad |\quad\quad |\ \ \backslash$
$\quad\quad\quad\quad\quad\quad\quad\quad CH-CH--OSO_2-$aryl radical
$\quad\quad\quad\quad\quad\quad\quad\quad\ |\ \ \ \backslash$ The compounds of the present invention can be prepared, for example, from steroids such as 21-acetoxy-16α,17α-oxido-11α-p-toluenesulfonyloxy-4-pregnene-3,20-doine; 21-acetoxy-11α-methanesulfonyloxy-16α,17α-oxido-4-pregnene-3,20-dione and the like described and claimed in the copending application Serial No. 686,868, filed September 30, 1957, now abandoned.

They can also be prepared from analogous progesterone derivatives such as 16α,17α-oxido-4,9(11)-pregnadiene-3,20-dione and 11α-methanesulfonyloxy-16α,17α-oxido-4-pregnene-3,20-dione described in United States Patent No. 2,703,799.

The various oxido derivatives, on treatment with hydrogen halide, can be converted to the corresponding 17α-hydroxy-16β-halo compounds which, on reaction with an organic acid anhydride in the presence of a strong acid catalyst, e.g. p-toluenesulfonic acid, will give the compounds of this invention.

Treatment of these latter compounds with reagents such as sodium acetate in hot glacial acetic acid will result in the reformation of the corresponding Δ⁴-3-one steroids and the development of the important 16α-alkanoyloxy-17α-hydroxy steroids. The resulting compounds which are disclosed in United States Patent 2,831,002 and in co-pending application Serial No. 720,564, filed March 11, 1958, can be converted into the highly active compounds disclosed and claimed in copending applications Serial No. 747,331, filed July 9, 1958, now abandoned, Serial No. 720,564, filed March 11, 1958, and in United States Patent 2,789,118, one of which is a commercial product sold under the name Aristocort (brand of triamcinolone). ($Δ^{1,4}$-pregnadiene-9α-fluoro-11β,16α,17α,21-tetrol-3,20-dione).

The following examples describe the preparation of the compounds of the present invention in greater detail.

Example 1

A solution of 21-acetoxy-16α,17α-oxido-11α-p-toluenesulfonyloxy-4-pregnene-3,20-dione (5.0 g.) in acetic acid (100 ml.) is treated with hydrobromic acid (30–32%) in acetic acid (5.0 ml.) at 15°, and the mixture is allowed to warm to room temperature over a period of thirty minutes. Water is then slowly added until precipitation is complete, and the crystalline precipitate is filtered and air dried. This material is redissolved in acetic acid (100 ml.) and recrystallized with the aid of water. This gives 21-acetoxy-16β-bromo-17α-hydroxy-11α-p-toluenesulfonyloxy-4-pregnene-3,20-dione, melting point 112–114°. A portion of this is recrystallized from acetone-water to give material melting at 135° (dec.); ultraviolet spectrum:

$$\lambda_{max.}^{MeOH}\ 229\ m\mu\ (\epsilon\ 24,300)$$

A solution of 21-acetoxy-16β-bromo-17α-hydroxy-11α-p-toluenesulfonyloxy-4-pregnene-3,20-dione (4.0 g.) in acetic anhydride (35 ml.) is treated with p-toluenesulfonic acid monohydrate (1.34 g.) and is allowed to stand overnight at room temperature. The solution is then chilled to 5° C. and 35 ml. of water is added. After stirring for about one hour, more water is added, until the precipitation is complete. The product is filtered, washed well with water and dried. This gives 3,17α,21-triacetoxy-16β-bromo-11α-p-toluenesulfonyloxy-3,5-pregnadiene-20-one, melting point 134° C. (dec.). Recrystallization from acetone-water raises the melting point to 152° C. (dec.); ultraviolet spectrum:

$$\lambda_{max.}^{MeOH}\ 227\ m\mu\ (\epsilon\ 30,000)$$

Example 2

A solution of 21-acetoxy-16α,17α-oxido-4,9(11)-pregnadiene-3,20-dione in acetic acid is treated with hydrobromic acid (30–32%) in a manner similar to that described in Example 1. The product, 21-acetoxy-16β-bromo-17α-hydroxy-4,9(11)-pregnadiene-3,20-dione, after recrystallization from acetone-petroleum ether melts at 148° (dec.); ultraviolet spectrum:

$$\lambda_{max.}^{MeOH}\ 238\ m\mu\ (\epsilon\ 17,000)$$

$[α]_D^{25}+71°$ (chloroform).

A solution of 21-acetoxy-16β-bromo-17α-hydroxy-4,9(11)-pregnadiene-3,20-dione and p-toluenesulfonic acid in acetic anhydride is treated in a manner similar to that described in Example 1. The crystalline residue is dried under reduced pressure to give 3,17α,21-triacetoxy-16β-bromo-3,5,9(11)-pregnatriene-20-one; melting point 94° C. (dec.).

Example 3

In a further experiment following the procedure of Example 1, 21-acetoxy-11α-p-toluenesulfonyloxy-16α,17α-oxido-4-pregnene-3,20-dione is treated with sodium iodide in acetic acid and the mixture worked up in a similar manner. The extract is evaporated to dryness to give 21-acetoxy-17α-hydroxy-16β-iodo-11α-p-toluenesulfonyloxy-4-pregnene-3,20-dione; ultraviolet spectrum:

$$\lambda_{max.}^{MeOH}\ 229\ m\mu\ (\epsilon\ 29,000)$$

In a manner similar to that described in Example 1, 21-acetoxy-17α-hydroxy-16β-iodo-11α-p-toluenesulfonyloxy-4-pregnene-3,20-dione in acetic anhydride is treated with p-toluenesulfonic acid monohydrate. After the usual workup, the product 3,17α,21-triacetoxy-16β-iodo-11α-p-toluenesulfonyloxy-3,5-pregnadiene-20-one is isolated, washed with water and dried; ultraviolet spectrum:

$$\lambda_{max.}^{MeOH}\ 227\ m\mu\ (\epsilon\ 29{,}200)$$

Example 4

In a manner similar to that described in Example 7, 21 - acetoxy - 11α-methanesulfonyloxy-16α,17α-oxido-4-pregnene-3,20-dione is treated with hydrobromic acid (30–32%) in acetic acid. After the usual workup, the product, 21 - acetoxy-16β-bromo-17α-hydroxy-11α-methanesulfonyloxy-4-pregnene-3,20-dione, is isolated, washed and dried; ultraviolet spectrum:

$$\lambda_{max.}^{MeOH}\ 238\ m\mu\ (\epsilon\ 16{,}000)$$

In a manner similar to that described in Example 1, 21 - acetoxy - 16β-bromo-17α-hydroxy-11α-methanesulfonyloxy-4-pregnene-3,20-dione in acetic anhydride is treated with p-toluenesulfonic acid monohydrate. After the usual workup, the product, 3,17α,21-triacetoxy-16β-bromo - 11α-methanesulfonyloxy-3,5-pregnadiene-20-one, is isolated and dried; ultraviolet spectrum:

$$\lambda_{max.}^{MeOH}\ 236\ m\mu\ (\epsilon\ 18{,}800)$$

Example 5

In a manner similar to that described in Example 1, 16α,17α-oxido-4,9(11)-pregnadiene-3,20-dione is treated with hydrobromic acid (30–32%) in acetic acid. After the usual workup, 16β-bromo-17α-hydroxy-4,9(11)-pregnadiene-3,20-dione is washed, dried and recrystallized from acetone-petroleum ether; melting point 182–184°; ultraviolet spectrum:

$$\lambda_{max.}^{MeOH}\ 238\ m\mu\ (\epsilon\ 17{,}900)$$

In a manner similar to that described in Example 1, 16β - bromo - 17α - hydroxy-4,9(11)-pregnadiene-3,20-dione in 25 ml. of acetic anhydride is treated with p-toluenesulfonic acid monohydrate. After the usual workup, the product is recrystallized from dilute acetone to give 3,17α - diacetoxy-16β-bromo-3,5,9(11)-pregnatriene-20-one as white needles, melting point 94–98° C.; ultraviolet spectrum:

$$\lambda_{max.}^{MeOH}\ 236\ m\mu\ (\epsilon\ 19{,}700)$$

Example 6

In the manner described in Example 1, 16α,17α-oxido-4,9(11)-pregnadiene-3,20-dione is treated with sodium iodide in acetic acid, and the mixture is worked up in a similar manner to give 17α-hydroxy-16β-iodo-4,9(11)-pregnadiene-3,20-dione as white needles melting at 166–168° C. (dec.); ultraviolet spectrum:

$$\lambda_{max.}^{MeOH}\ 238\ m\mu\ (\epsilon\ 17{,}300)$$

$[\alpha]_D^{25}+118°$ (methanol).

In the manner described in Example 1, 17α-hydroxy-16β-iodo-4,9(11)-pregnadiene-3,20-dione is allowed to react with p-toluenesulfonic acid and acetic anhydride. The product, 3,17α-diacetoxy-16β-iodo-3,5,9(11)-pregnatriene-20-one, is obtained as white needles, melting point 113–115° C. (dec.) by recrystallization from dilute acetone; ultraviolet spectrum:

$$\lambda_{max.}^{MeOH}\ 235\ m\mu\ (\epsilon\ 20{,}000)$$

Example 7

A solution of 16α,17α-epoxy-11α-methanesulfonyloxy-4-pregnene-3,20-dione in carbon tetrachloride-acetic acid (1:1 v./v.) is cooled to 18° C. This solution is treated with 32% hydrogen bromide in glacial acetic acid solution; an oily layer separates. The mixture is stirred magnetically for thirty minutes and then poured onto 1000 ml. of cracked ice. The solid which separates is collected by filtration and dried to give 16β-bromo-17α-hydroxy-11α - methanesulfonyloxy-4-pregnene-3,20-dione; melting point 165–168° (dec.); ultraviolet spectrum:

$$\lambda_{max.}^{MeOH}\ 238\ m\mu\ (\epsilon\ 17{,}600)$$

A suspension of 16β-bromo-17α-hydroxy-11α-methanesulfonyloxy-4-pregnene-3,20-dione in methylene chloride is treated with p-toluenesulfonic acid hydrate and acetic anhydride. The mixture is magnetically stirred during eighteen hours; all solid dissolves during this time. The methylene chloride is removed at 40° C., and the residual solution is magnetically stirred with excess water while being chilled in an ice bath. After the acetic anhydride has hydrolyzed, the solution is diluted with water and extracted with methylene chloride. The solvent is removed to give 3,17α-diacetoxy-16β-bromo-11α-methanesulfonyloxy-3,5-pregnadiene-20-one as an amorphous material; ultraviolet spectrum:

$$\lambda_{max.}^{MeOH}\ 235\ m\mu\ (\epsilon\ 18{,}500)$$

Example 8

A solution of 16α,17α-epoxy-11α-methanesulfonyloxy-4-pregnene-3,20-dione in carbon tetrachloride-acetic acid (1:1 v./v.) is cooled to 18° C. This solution is treated with a solution prepared by saturating glacial acetic acid with hydrogen chloride at 25° C. The solution is magnetically stirred for thirty minutes and then poured onto cracked ice. The solid which separates is collected by filtration to give 16β-chloro-17α-hydroxy-11α-methanesulfonyloxy-4-pregnene-3,20-dione; ultraviolet spectrum:

$$\lambda_{max.}^{MeOH}\ 238\ m\mu\ (\epsilon\ 17{,}400)$$

A suspension of 16β-chloro-17α-hydroxy-11α-methanesulfonyloxy-4-pregnene-3,20-dione in excess acetic anhydride containing p-toluenesulfonic acid is magnetically stirred at room temperature for seventeen hours. The solution is poured into excess water, chilled in an ice bath and magnetically stirred until the acetic anhydride is hydrolyzed. The solid is collected by filtration and dried under reduced pressure over phosphorus pentoxide to give 3,17α-diacetoxy-16β-chloro-11α-methanesulfonyloxy-3,5-pregnadiene-20-one; ultraviolet spectrum: $\lambda$ 235 m$\mu$ ($\epsilon$ 19,000).

Example 9

A solution of 16β-bromo-17α-hydroxy-4,9(11)-pregnadiene-3,20-dione and p-toluenesulfonic acid in 25 ml. of butyric anhydride is treated as described in Example 8. The resulting product 3,17α-di-n-butyryloxy-16β-bromo-3,5,9(11)-pregnatriene-20-one has $$\lambda_{max.}^{MeOH}\ 235\ m\mu\ (\epsilon\ 20{,}000)$$

Example 10

A solution of 3,17α,21-triacetoxy-11α-p-toluenesulfonyloxy-16β-bromo-3,5-pregnadiene-20-one (1.0 g.) and sodium acetate (2.0 g.) in acetic acid (18 ml.) is refluxed for nineteen and one-half hours. Water is then added, and the mixture is extracted with methylene chloride. The extract is washed twice with water, once with saturated sodium bicarbonate solution, once more with water and dried over magnesium sulfate. The extract is evaporated to dryness, and the resultant hard glass dissolved in benzene and chromatographed on silica gel (30 g.). The product, 16α,21-diacetoxy-17α-hydroxy-4,9(11)-pregnadiene-3,20-dione, is eluted with benzene-ether (1:1) and crystallized from acetone-petroleum ether to give crystals, melting point 120–122° C. (bubbles), resolidifying and re-melting at 184–186° C.; ultraviolet spectrum:

$$\lambda_{max.}^{MeOH}\ 239\ m\mu\ (\epsilon\ 14{,}200)$$

The infrared spectrum is identical to that of an authentic sample.

Example 11

A solution of 1.0 g. of 3,17α,21-triacetoxy-16β-bromo-3,5,9(11)-pregnatriene-20-one and 2.0 g. of sodium acetate in 30 ml. of acetic acid is allowed to reflux for three hours. Most of the acetic acid is removed under reduced pressure, and 100 ml. of water is added. The dark brown precipitate is removed by filtration, and more water is added to the filtrate. The filtrate is extracted with methylene chloride, and the organic solution is washed with saturated sodium bicarbonate solution and water. The organic solution is taken to dryness, and the residue is crystallized from acetone-petroleum ether to give crystals; melting point 184–187° C.; ultraviolet spectrum:

$$\lambda_{max.}^{MeOH}\ 238\ m\mu\ (\epsilon\ 16,500)$$

The infrared spectrum of this material and that of an authentic sample of 16α,21-diacetoxy-17α-hydroxy-4,9(11)-pregnadiene-3,20-dione are identical.

*Example 12*

In a manner similar to that described in Example 10, 3,17α,21 - triacetoxy-11α-p-toluenesulfonyloxy-16β-iodo-3,5-pregnadiene-20-one in acetic acid is refluxed with sodium acetate. After the usual workup, the residue is crystallized from acetone-petroleum ether to give the product 16α,21-diacetoxy-17α-hydroxy-4,9(11)-pregnadiene-3,20-dione. The infrared spectrum is identical to that of an authentic sample.

*Example 13*

In a manner similar to that described in Example 10, 3,17α,21 - trihydroxy-16β-bromo-11α-methanesulfonyloxy-3,5-pregnadiene-20-one is refluxed with acetic acid containing sodium acetate. After the usual workup, the product, 16α,21-diacetoxy-17α-hydroxy-4,9(11)-pregnadiene-3,20-dione, is crystallized from acetone-petroleum ether. The infrared spectrum is identical to that of an authentic sample.

*Example 14*

A mixture of 3.300 g. (6.72 moles) of 16α-bromo-3,5,9(11)-pregnatriene-3,17α-diol-20-one 3,17-diacetate, 6.60 g. of anhydrous sodium acetate and 100 ml. of glacial acetic acid is allowed to reflux during six hours. All solid dissolves when the reflux temperature is reached. The cooled solution is concentrated to near dryness; the residue is triturated with 200 ml. of water. The solid is collected by filtration to give 2.489 g. of solid, melting point 135–160° C. This solid is dissolved in 15 ml. of benzene and chromatographed on a silica gel column (20 x 100 mm.). The column is washed with 200 ml. of methylene chloride-benzene (30:10), 500 ml. of methylene chloride, 200 ml. of chloroform-methylene chloride (20:80), 400 ml. of chloroform-methylene chloride (50:50); these washings are discarded. The column is then washed with 1400 ml. of chloroform; 100 ml. percolates are collected, and the material eluted in percolates 8–12 is combined. Recrystallization from methylene chloride-petroleum ether gives 1.446 g. (57% yield) of 4,9(11)-pregnadiene-16α,17α-diol-3,20-dione 16-acetate as white feathery needles, melting point 170–180° (bubbling); ultraviolet spectrum:

$$\lambda_{max.}^{MeOH}\ 240\ m\mu\ (\epsilon\ 16,300)$$

Recrystallization from acetone petroleum ether gives material melting at 179–188° C. The infrared spectrum is identical to that of an authentic sample.

*Example 15*

In the same manner described in Example 14, 3.228 g. (6.0 moles) 3,17α-diacetoxy-16β-iodo-3,5,9(11)-pregnatriene-20-one and 6.40 g. of sodium acetate and 100 ml. of glacial acetic acid are heated six hours to give 1.307 g. (37% yield) of needles, melting point 170–180° C. (bubbling) after recrystallization from methylene chloride-petroleum ether. The infrared spectrum of this material was identical with that of an authentic sample of 16α - acetoxy - 17α - hydroxy-4,9(11)-pregnadiene-3,20-dione.

*Example 16*

The material from Example 7 is heated with sodium acetate in refluxing glacial acetic acid as described previously. This procedure gives white needles, melting point 173–188° C. (bubbling), after chromatography and recrystallization from benzene-petroleum ether. The infrared spectra of this material and that of an authentic sample of 16α-acetoxy-17α-hydroxy-4,9(11)-pregnadiene-3,20-dione are identical.

*Example 17*

A mixture of 1.650 g. of 3,17α-diacetoxy-16β-chloro-11α-methanesulfonyloxy-3,5-pregnadiene-20-one, 6.60 g. of anhydrous sodium acetate and 50 ml. of glacial acetic acid is allowed to reflux during six hours. The cooled solution is concentrated to near dryness; the residue is triturated with 150 ml. of water. The solid thus obtained is chromatographed on silica gel. That material eluted with chloroform is recrystallized from acetone-petroleum ether to give 16α-acetoxy-17α-hydroxy-4,9(11)-pregnadiene-3,20-dione as white crystals, melting point 179–188° C. (bubbling). The infrared spectrum is identical to that of an authentic sample.

*Example 18*

A solution of 0.384 g. (1.0 mole) of 16α-acetoxy-17α-hydroxy-4,9(11)-pregnadiene-3,20-dione, 15 ml. of methanol, 5 ml. of water and 0.17 ml. of 37% hydrochloric acid solution is allowed to reflux during three hours. The solution is concentrtaed until solid begins crystallizing, chilled, in an ice bath and filtered to give 0.231 g. (67% yield) of crystals, melting point 185–196° C. Two recrystallizations from acetone-petroleum ether give white prisms, melting point 220–223° C.; ultraviolet spectrum:

$$\lambda_{max.}^{MeOH}\ 239\ m\mu\ (\epsilon\ 17,200)$$

The infrared spectrum of this material is identical with that of known 16α,17α-dihydroxy-4,9(11)-pregnadiene-3,20-dione.

We claim:

1. The compound 3,17α,21-triacetoxy-16β-bromo-11α-p-toluenesulfonyloxy-3,5-pregnadiene-20-one.
2. The compound 3,17α,21-triacetoxy-16β-iodo-11α-p-toluenesulfonyloxy-3,5-pregnadiene-20-one.
3. The compound 3,17α,21-triacetoxy-16β-bromo-11α-methanesulfonyloxy-3,5-pregnadiene-20-one.
4. The compound 3,17α - diacetoxy - 16β - bromo-11α-methanesulfonyloxy-3,5-pregnadiene-20-one.
5. The compound 3,17α - diacetoxy - 16β - chloro-11α-methanesulfonyloxy-3,5-pregnadiene-20-one.
6. Compounds having the general formula:

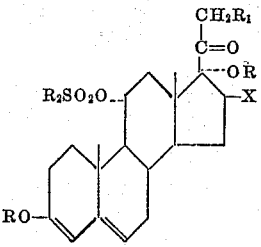

in which R is a lower alkanoyl radical, $R_1$ is a member of the group consisting of hydrogen and lower alkanoyloxy radicals, X is a (β) halogen atom and $R_2$ is a member of the group consisting of lower alkyl and mononuclear aryl radicals.

References Cited in the file of this patent

UNITED STATES PATENTS

| | | |
|---|---|---|
| 2,703,799 | Bergstrom | Mar. 8, 1955 |
| 2,835,667 | Ercoli et al. | May 20, 1958 |
| 2,859,224 | Farrar et al. | Nov. 4, 1958 |

OTHER REFERENCES

Rosenkranz et al.: Fortschritte der Chemie organischer Naturstoffe (Vienna, 1953), vol. 10, pages 291–93.